United States Patent [19]

Lamothe, II

[11] Patent Number: 4,466,706

[45] Date of Patent: Aug. 21, 1984

[54] OPTICAL FLUID LENS

[76] Inventor: Frederick H. Lamothe, II, R.D. 3, Box 407, Bloomsburg, Pa. 17815

[21] Appl. No.: 356,823

[22] Filed: Mar. 10, 1982

[51] Int. Cl.³ ............................ G02B 3/12; G02B 3/14
[52] U.S. Cl. ..................................................... 350/419
[58] Field of Search .............................. 350/419, 418

[56] References Cited

U.S. PATENT DOCUMENTS 2,300,251 10/1942 Flint ..................................... 350/419
2,592,222 4/1952 Williams ............................. 350/419

Primary Examiner—John K. Corbin
Assistant Examiner—Rebecca D. Gass
Attorney, Agent, or Firm—D. Paul Weaver

[57] ABSTRACT

A lens particularly for applications requiring a large lens eliminates costly grinding and polishing operations. The lens embodies an adjustable chamber containing an optical fluid which can be pressurized in varying degrees by altering the size of the chamber. Resilient optical diaphragms at the ends of the chamber have their curvatures changed responsive to changes in the pressure of the fluid in the chamber to produce a lens of fixed or variable focal length.

11 Claims, 5 Drawing Figures

OPTICAL FLUID LENS

BACKGROUND OF THE INVENTION

There is a growing need for large lenses, such as large objective lenses for astronomical telescopes, projection lenses for television receivers, aerial camera lenses, satellite camera lenses and concentrating lenses for solar generating devices. The manufacturing of such large lenses by conventional methods involving the grinding and polishing of glass is exceedingly expensive and time-consuming.

The simple objective of the present invention is to provide large optical lenses of a quality which will satisfy many applications including those enumerated above and which can be produced without any grinding and polishing operations whatsoever, thus drastically reducing the cost of the lens.

Another object of the invention is to provide a lens whose focal length can be easily and quickly adjusted.

In accordance with the invention, these objectives are achieved by use of a variable chamber adapted to be filled with an optically clear fluid, liquid or gaseous, the pressure of which fluid is regulated by adjusting the volume of the chamber containing it. The chamber is closed at opposite ends by resilient optically clear diaphragm elements which bend or bulge with varying degrees of curvature responsive to pressure changes induced in the fluid within the chamber to thereby establish the optical parameters of the lens. Typically, a pair of axially adjustable threaded telescoping sleeves define a chamber for a suitable optical fluid, the opposite outer ends of the chamber being closed by a pair of relatively thin resilient optical discs formed of available plastics material. The discs have their curvatures altered in response to changes in pressure in the fluid filling the chamber. Two or more spaced discs can be employed in the system.

Other features and advantages of the invention will become apparent during the course of the following description.

DETAILED DESCRIPTION

Figure 1:
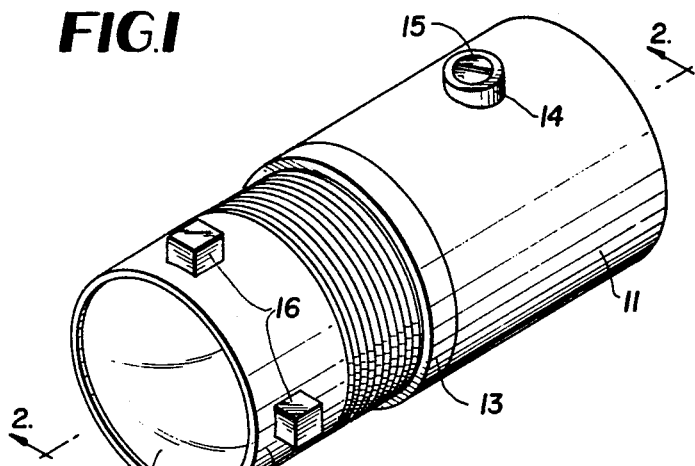
FIG. 1 is a perspective view of an optical lens in accordance with the invention.
Figure 2:
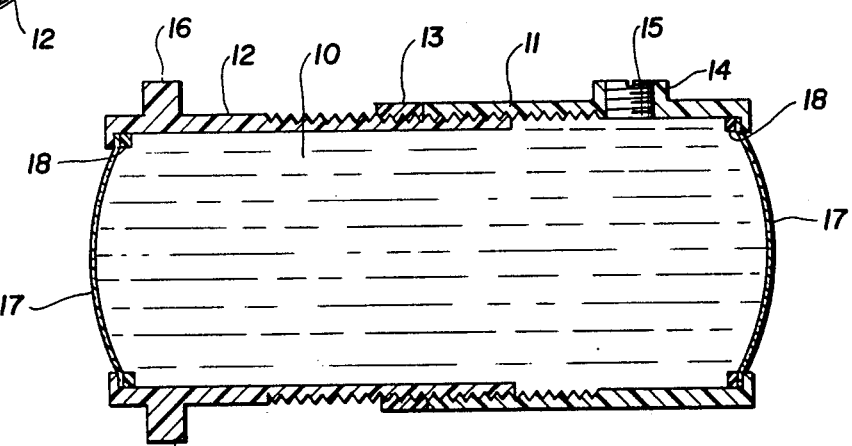
FIG. 2 is a central vertical longitudinal section taken on line 2—2 of FIG. 1.

Referring to the drawings in detail wherein like numerals designate like parts, an optical lens comprises a fluid-filled chamber 10 of variable size defined by a pair of telescoping internally and externally threaded rigid sleeves 11 and 12. The two sleeves may be locked releasably in selected adjusted positions by a threaded locking ring 13. The sleeve 11 has a fluid filling port 14 equipped with a closure plug 15. The sleeve 12 carries radial projections 16 to assist in rotating the threaded sleeve 12 relative to the sleeve 11 for adjusting the size of the chamber 10.

The opposite ends of the chamber 12 are closed by two resilient optically clear plastics discs 17 which are sealed with respect to the outer ends of the sleeves 11 and 12 in any conventional manner, as by sealing rings 18 or the like. The two discs 17 define with the adjustable sleeves 11 and 12 the variable fluid-filled and fluid-tight chamber 10.

The chamber 10 is filled through the port 14 with an optically clear fluid, liquid or gas, having a desired index of refraction and other optical qualities. The fluid may be water or certain known commercial optical oils. The discs 17 are formed from known clear plastics having the required optical properties.

Figure 3:
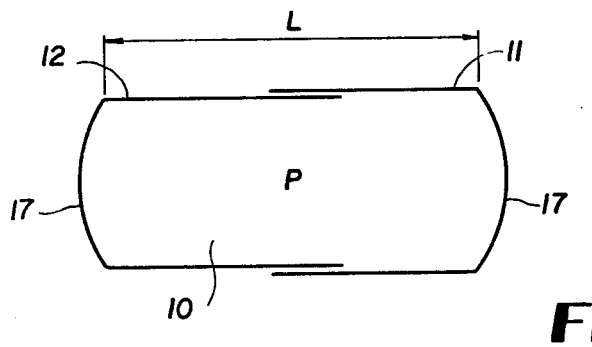
FIGS. 3 and 4 are schematic views depicting the operation of the lens in response to pressure changes.
Figure 4:
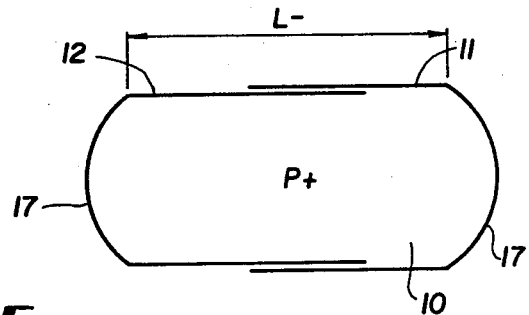

In the use of the lens structure, the two threaded sleeves 11 and 12 are rotated one relative to the other to adjust the length of chamber 10. Any change, increase or decrease, in the size of the closed chamber 10 will have the effect of altering the degree of curvature of the two resilient discs 17 which respond to the internal fluid pressure, whatever that pressure may be. As shown in FIG. 3, if the pressure P is diminished by adjusting the two sleeves 11 and 12 outwardly axially, the resulting curvature of the discs 17 may be lessened and the discs will approach a more flat state. FIG. 4 shows the condition where pressure P+ in the chamber 10 is increased by adjusting the two telescoping sleeves inwardly or together. The increased fluid pressure acting on the discs 17 correspondingly increases their curvature. In all cases, the resilient discs will assume a convex form as illustrated and their curvature will vary with pressure changes in the chamber 10. Accordingly, by adjusting the two threaded sleeves 11 and 12 and locking them in selected adjusted positions, the focal length of the lens unit may be established as desired, and may be varied by readjusting the two sleeves. The arrangement entirely obviates traditional lens grinding and polishing operations and a very inexpensive large lens can be produced to satisfy a number of commercial and scientific applications, as previously discussed.

Figure 5:
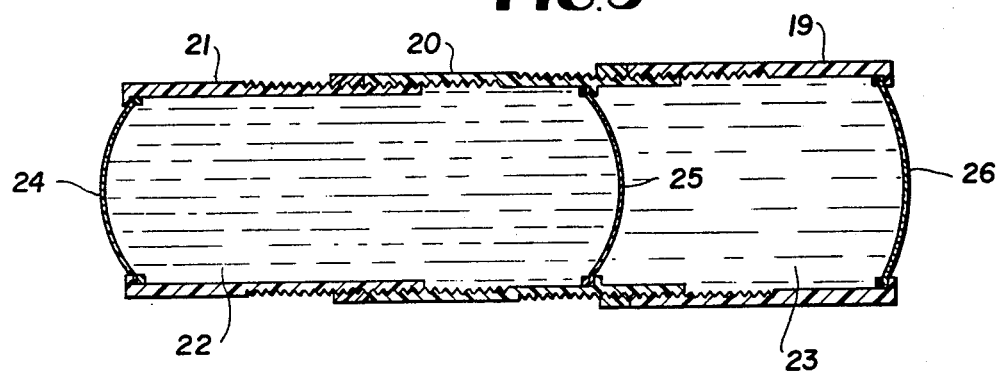
FIG. 5 is a view similar to FIG. 2 showing a modification.

FIG. 5 shows a variation of the invention in which three telescoping threaded sleeves 19, 20 and 21 are employed to form two fluid-filled chambers 22 and 23 whose ends are defined by three resilient optical discs 24, 25 and 26. As the sleeves 20 and 21 are adjusted in the described manner to vary the pressure of fluid in the chamber 22, the curvature of discs 24 and 25 will be adjusted and established. Adjustment of the sleeve 19 relative to the intermediate sleeve 20 will regulate the pressure in chamber 23 and correspondingly adjust the curvature of disc 26 so that a compound lens can be provided. Pressure in the chamber 22 will always be made slightly larger than the pressure in chamber 23 so that adjustment of the disc 26 will not effect the curvature of discs 24 and 25. Therefore, the curvature of disc 26 will be somewhat different from that of discs 24 and 25 and varying lens characteristics can be achieved.

The curvatures of discs 17 are exactly the same for a given pressure if they possess the same thickness and are made from the same material. However, the two discs could have different curvatures for the same pressure if formed in different thicknesses or made of different materials. This possibility further widens the utility of the invention.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An optical lens comprising a pair of telescopically interfitting threaded sleeves adapted for relative movement axially in response to turning, a pair of resilient optical diaphragm elements secured to and closing the outer ends of said sleeves and defining therewith a closed variable chamber, and an optical fluid filling said chamber between said diaphragm elements and being pressurized in varying degrees by adjustments of said sleeves and the pressure of said fluid acting directly on said diaphragm elements to impart thereto varying degrees of curvature.

2. An optical lens as defined in claim 1, and means to releasably lock said sleeves securely in selected axially adjusted positions.

3. An optical lens as defined in claim 2, and said diaphragm elements comprising resilient optical plastics discs sealed in the outer ends of said sleeves.

4. An optical lens as defined in claim 1, and an intermediate resilient optical diaphragm element between said pair and defining therewith a pair of separated pressurized fluid-filled chambers having different pressures, whereby the curvature of one end diaphragm element can be changed relative to the curvatures of the other two diaphragm elements whose latter curvatures are of the same degree.

5. An optical lens as defined in claim 4, and an intermediate threaded sleeve between and threadedly engaging said pair of sleeves, and the intermediate diaphragm element being secured to the intermediate sleeve.

6. An optical lens as defined in claim 1, and a fluid filling port and closure means on one of said threaded sleeves.

7. An optical lens as defined in claim 1, and turning lug means on one of said sleeves.

8. An optical lens as defined in claim 1, and said diaphragm elements when responding to fluid pressure bulging axially outwardly in opposite directions at the opposite ends of said chamber.

9. An optical lens comprising a pair of interfitting sleeves adapted for relative movement axially, a pair of resilient optical diaphragm elements secured to and closing the outer ends of said sleeves and defining therewith a closed variable volume chamber, and an optical fluid filling said chamber between said diaphragm elements and being pressurized in varying degrees by axial adjustments of said sleeves, and the pressure of said fluid acting on said diaphragm elements to impart thereto varying degrees of curvature.

10. An optical lens as defined in claim 9, and an intermediate resilient optical diaphragm element between said pair and defining therewith separated pressurized fluid-filled chambers of different pressures, whereby the curvature of one end diaphragm element can be changed relative to the curvatures of the other two diaphragm elements.

11. An optical lens as defined in claim 10, and an intermediate sleeve interfitting with said pair of sleeves and being adjustable axially relative thereto, and said intermediate diaphragm element being secured to the intermediate sleeve.

* * * * *

UNITED STATES PATENT AND TRADEMARK OFFICE
CERTIFICATE OF CORRECTION

PATENT NO. : 4,466,706

DATED : August 21, 1984

INVENTOR(S) : Frederick H. Lamothe, II

It is certified that error appears in the above-identified patent and that said Letters Patent is hereby corrected as shown below:

The address of the inventor is incorrect, and should be changed to read as follows:

R.D.#2, Box 2073
Fleetwood, Pennsylvania 19522

Signed and Sealed this

Fifth Day of March 1985

[SEAL]

*Attest:*

DONALD J. QUIGG

*Attesting Officer*     *Acting Commissioner of Patents and Trademarks*